(12) United States Patent
Huang et al.

(10) Patent No.: US 9,009,652 B2
(45) Date of Patent: Apr. 14, 2015

(54) METHOD AND SYSTEM FOR HANDLING SOFTWARE DESIGN CONFLICTS

(75) Inventors: Ying Huang, Beijing (CN); Ying Liu, Beijing (CN); Wei Zhao, Beijing (CN); Xin Zhou, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 12/913,913

(22) Filed: Oct. 28, 2010

(65) Prior Publication Data

US 2011/0107303 A1 May 5, 2011

(30) Foreign Application Priority Data

Oct. 30, 2009 (CN) .......................... 2009 1 0211378

(51) Int. Cl.
*G06F 9/44* (2006.01)

(52) U.S. Cl.
CPC ........................ *G06F 8/71* (2013.01)

(58) Field of Classification Search
USPC ................................................ 717/104–105
See application file for complete search history.

(56) References Cited

U.S. PATENT DOCUMENTS

| 2006/0190105 | A1* | 8/2006 | Hsu et al. ........................ 700/86 |
| 2008/0046864 | A1* | 2/2008 | Bai et al. ....................... 717/105 |
| 2009/0144704 | A1* | 6/2009 | Niggemann et al. .......... 717/124 |
| 2010/0313179 | A1* | 12/2010 | Groves et al. ................. 717/101 |

FOREIGN PATENT DOCUMENTS

| CN | 101126976 A | 2/2008 |
| CN | 101370009 A | 2/2009 |

OTHER PUBLICATIONS

M. Antkiewicz and K. Czarnicki, Design Space of Heterogeneous Synchronization, Lecture Notes in Computer Science, 2008, 3-46, vol. 5235/2008.
M.Z. Ouertani et al., A product data dependencies network to support conflict resolution.., Computational Engineering in Systems Applications, Oct. 2006, 1189-1196, Beijing.
P. Sriplakich, Supporting Collaborative Development in an Open MDA Environment, Proceedings of the 22nd IEEE International Conference on Software Maintenance, Sep. 2006, 244-253.
Abstract_CN101370009A.
Abstract_CN101126976A.

* cited by examiner

*Primary Examiner* — Li B Zhen
*Assistant Examiner* — Duy Khuong Nguyen
(74) *Attorney, Agent, or Firm* — Cantor Colburn LLP

(57) ABSTRACT

A method and a system for identifying and resolving conflicts between design results from a parallel software design. The method includes: receiving a design diagram, wherein the design diagram includes a plurality of nodes and arrows connecting different nodes, with each node indicating a design artifact, and an arrow directed from one node to another node indicating that a design artifact corresponds to the one node depends on a design artifact corresponding to the other node; determining a level of a design artifact in the design diagram, identifying different design artifacts at a given level of the design diagram that depend on a common design artifact, and marking them as isomorphic design artifacts; and outputting a design diagram with the isomorphic design artifacts marked. A conflict between relevant designs are automatically identified in a bottom-up approach according to a software design hierarchy to facilitate conflict resolution.

12 Claims, 11 Drawing Sheets

METHOD AND SYSTEM FOR HANDLING SOFTWARE DESIGN CONFLICTS

CROSS REFERENCE TO RELATED APPLICATION

This applications claims priority under 35 U.S.C. 119 from Chinese Application 200910211378.5, filed Oct. 30, 2009, the entire contents of which are hereby incorporated by reference.

BACKGROUND OF THE INVENTION

1. Field of the Invention

The present invention relates to software design, and in particular, to identification and resolution of conflicts between design results in a parallel software design.

2. Description of Related Art

A software development process may be typically divided into three major stages: requirement analysis, software design, and software implementation. In the software design stage, software design is carried out in accordance with certain standards based on a requirement specification provided by the requirement analysis stage, and the design result is the blueprint for a programming engineer in the software implementation stage. In a large software development project, parallel design (also called distributed design or collaborative design) is always employed. In such an approach, different design tasks are first formed according to different function decomposition or other aspects (architecture layer, use case, etc) of the software in design. Then different design tasks may be allocated to different designers. Finally, a complete software design is generated by composing design results provided by different designers.

However, there are potential conflicts or inconsistencies among design results from different designers. For example, a common computing resource may be used by design artifacts of two different designers' designs (for example, a common database or data table is accessed, or a common function is called), but the design to the common resources are inconsistent or conflict. During software design, conflicts should be eliminated or mitigated in order to facilitate improving programming efficiency during the programming stage, reducing potential errors occurring in software execution, and maintaining the software. To resolve a conflict, it is first necessary to identify conflicts between design results by different designers. However, the complexity of design results makes it very difficult to manually identify a conflict between different design results, especially in a large software design project involving thousands of design artifacts.

BRIEF SUMMARY OF THE INVENTION

To overcome these deficiencies, the present invention provides a method for handling software design conflicts, including: a receiving step of receiving a design diagram of a software design, wherein the design diagram includes a plurality of nodes and arrows connecting the nodes, wherein each node indicates a design artifact, and each arrow pointing from one node to another node indicates that the design artifact corresponding to the one node depends on the design artifact corresponding to the other node; an identifying step of determining a level of the design artifact in the design diagram, identifying different design artifacts at a given level of the design diagram that depend on a common design artifact, and marking them as isomorphic design artifacts; and an outputting step of outputting a new design diagram with the isomorphic design artifacts marked.

In another aspect, the present invention provides a system for handling software design conflicts, including: a receiving unit, for receiving a design diagram of a software design, wherein the design diagram includes a plurality of nodes and arrows connecting the nodes, with each node indicating a design artifact, and an arrow pointing from one node to another node indicating that the design artifact corresponding to the one node depends on the design artifact corresponding to the other node; an identifying unit, for determining a level of a design artifact in the design diagram, identifying different design artifacts at a given level of the design diagram that depend on a common design artifact, and marking them as isomorphic design artifacts; and an outputting unit, for outputting a new design diagram with the isomorphic design artifacts marked.

In yet another aspect, the present invention provides a method for handling software design conflicts, including: a receiving step of receiving at least two sub-design diagrams of a software design, wherein the sub-design diagrams are merged to form a composed design diagram, wherein the composed design diagram includes a plurality of nodes and arrows connecting the nodes, wherein each node indicates a design artifact, and the arrow pointing from one node to another node indicates that the design artifact corresponding to the one node depends on the design artifact corresponding to the other node, an identifying step of determining a level of the design artifact in the composed design diagram, identifying different design artifacts at a given level of the composed design diagram that depend on a common design artifact according to a software architectural hierarchy, and marking them as isomorphic design artifacts, an outputting step of outputting a new design diagram with the isomorphic design artifacts marked, a determining step of determining whether the marked isomorphic design artifacts are of a duplicate relationship, whereby retaining one of the isomorphic design artifacts while deleting the remaining isomorphic design artifacts, wherein the arrow pointing to the nodes of the deleted isomorphic design artifacts are changed to point to the node of the retained isomorphic design artifact, and a determining step of determining whether the marked isomorphic design artifacts are of a mergeable relationship, whereby merging the isomorphic design artifacts into a new design artifact, deleting the isomorphic design artifacts, and changing the arrow originally connected to the deleted isomorphic artifacts so that it connects the new design artifacts.

BRIEF DESCRIPTION OF THE SEVERAL VIEWS OF THE DRAWINGS

The above and other objectives, features and advantages of the present invention will become more apparent through a more detailed description on the preferred embodiments of the present invention as illustrated in the diagrams; in the diagrams, like or similar reference signs typically indicate like or similar components or parts in the preferred embodiments of the present invention.

DETAILED DESCRIPTION OF THE PREFERRED EMBODIMENTS

Hereinafter, the embodiments of the present invention will be described in more detail with reference to the accompanying diagrams where the embodiments of the present invention are illustrated. However, the present invention may be implemented in various manners and should not be understood to be limited by the embodiments disclosed herein. On the premise of not affecting those skilled in the art in understanding and implementing the present invention, components or details having no direct relationship with the content of the present invention are omitted in the embodiments and the accompanying diagrams, which is intended for making the content of the present invention more prominent, allowing those skilled in the art to understand the essence of the present invention more clearly.

According to the present invention, a basic idea for identifying a conflict between parallel designs is as follows: For a given level in a hierarchical structure, analysis is performed to check whether different design artifacts depend on a common lower-level design artifact; if so, there may be a conflict; otherwise, there would be no conflict. According to the present invention, a conflict between parallel designs may be identified and resolved in a bottom-up approach.

Figure 1:
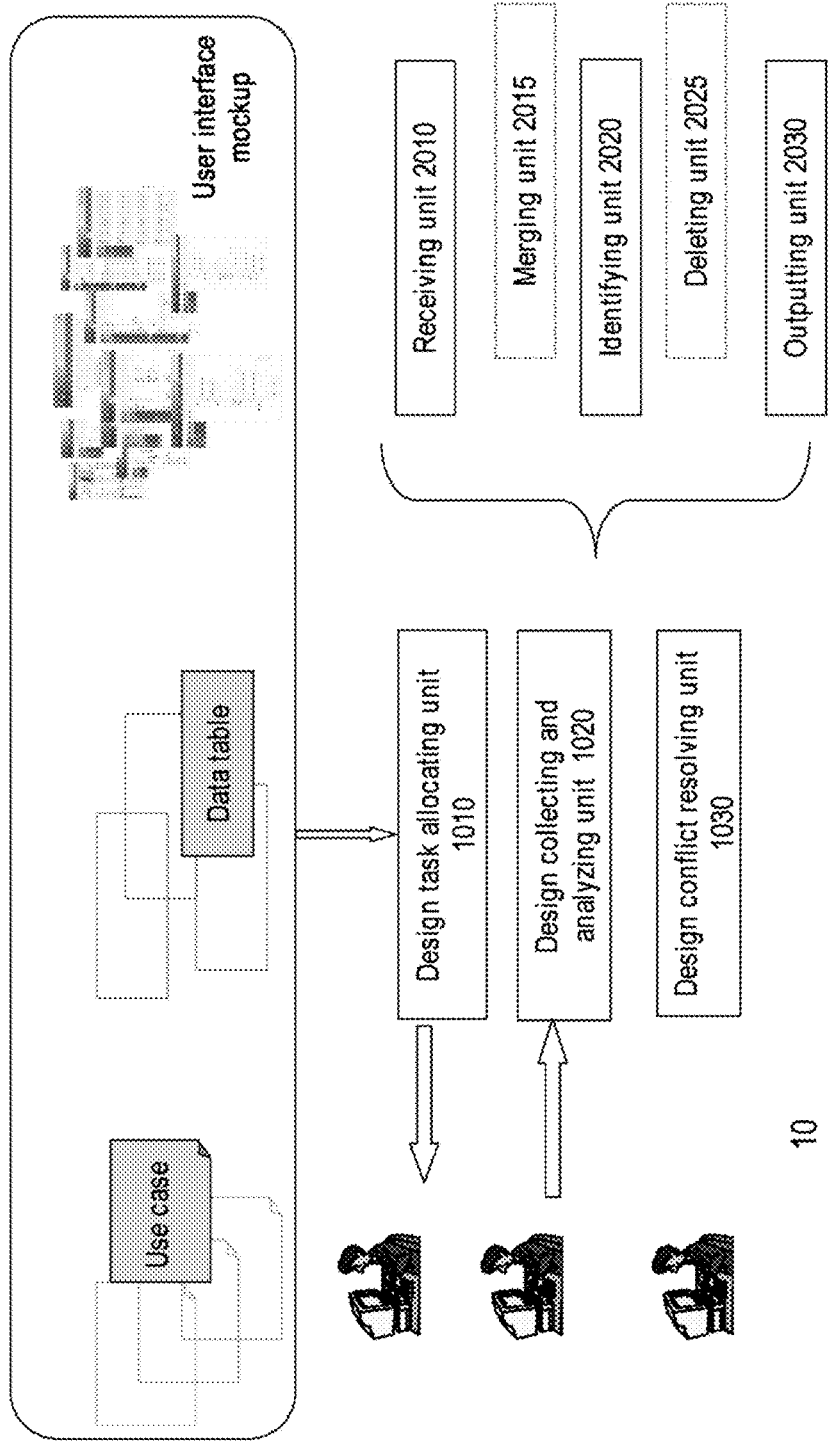
FIG. 1 shows the architecture of a software design system according to an embodiment of the present invention.

FIG. 1 shows architecture of a software design system 10 according to an embodiment of the present invention. The software design system 10 as shown in FIG. 1 includes a design task allocating unit 1010, a design collecting and analyzing unit 1020, and a design conflict resolving unit 1030.

The design task allocating unit 1010 may allocate design tasks to different designers. When the system is executed, the design task allocating unit 1010 allocates tasks to designers based on a requirement specification obtained from the requirement analysis stage of software development, and stores the design tasks and corresponding designers in a database. As shown in FIG. 1, the requirement specification used as input to the design task allocating unit 1010 can, for example, include use cases (or functions), a data table (database), some user interface design mockup, a naming rule (not shown), etc. A Use case is taken as the decomposition criteria for the software design units in this sample; in other words, each design unit is required to implement one use case. Typically, in a parallel software design, design tasks are firstly allocated to designers based on use cases. Design results by the designers will be collected and composed into a complete design.

According to an embodiment of the present invention, the design task allocating unit 1010 decomposes design tasks based on use cases, and allocates the decomposed tasks to individual designers. Note that the allocation of design tasks may be carried out manually.

Designers accomplish the design of the allocated use cases according to design standards, and submit design results. The design standards include, but are not limited to, hierarchical structure specification, naming specification, and design depth, and shall comply with certain rules—design artifacts at a data access level shall be connected to a relevant database or data table and descriptions of design artifacts of use cases and their internal relationship, etc.

The design collecting and analyzing unit 1020 may collect design results and perform conflict analysis on these design results. In the context of the present invention, the term "conflict" is used to indicate a kind of relationship between design artifacts. A conflict between two design artifacts means that both of the two design artifacts depend on another common design artifact, for example, both calling another common design artifact, or both accessing another common data source, such as a database. Details of conflict analysis will be further explained with reference to the examples below.

The design conflict resolving unit 1030 may resolve conflicts between designs according to the analysis results of the design collecting and analyzing unit, and obtain a new design result based on the conflict resolution.

The new design result may be outputted to the design collecting and analyzing unit 1020 for further analyzing, or may be provided to the software programming stage as a basis for programming.

Before explaining in more detail an embodiment of identifying and resolving a conflict between parallel designs according to the present invention, several use cases involved in an example software design will be introduced first, so that the description of the embodiment of identifying and resolving a conflict between parallel designs may be better understood.

Use Case 1: User Registration

Use case 1 has the following functions:

Clicking, by a user, on a "registration" button in a logon window on a platform's homepage;

Entering in a role selection page of the registration page to select a role to be registered;

a) If the selected role is the company's project manager and quality administrator:

Clicking on "agreeing with the contract", then clicking on "Yes", and then entering into the page for entering a company account;

Entering a correct username and password of a company administrator, clicking on "Yes," and then entering into a user information fill-in page;

After entering correct information and clicking on "Yes," the information is successfully saved, and a prompt page pops out;

b) If the selected role is company administrator, then entering into the administrator information page;

c) If the selected role is company developer, then entering into the company developer information page;

d) If the selected role is personal developer, then entering into the personal developer information page;

e) If the selected role is personal project administrator, then entering into the personal project administrator information page; and f) If the selected role is personal quality administrator, then entering into the personal quality administrator information page.

For simplicity, the parts identical to circumstance a) are omitted in the above descriptions of various circumstances from b)-f), for example, "after entering the correct information . . . a prompt page pops out".

Use Case 2: Logon

Entering, by the user, a username and password in the logon window on the platform's front page, and clicking on the button "logon";

If the username or password is wrong, then entering into a logon fail page; otherwise, based on the role of the username as recorded in the database:

a) If the role is a project manager, then finding all projects managed by the user and displaying the projects in a project list page;

b) If the role is a company administrator, then finding all projects under the company, and entering into a project list page;

c) If the role is a developer, then finding all tasks under the user, and entering into the developer's task list page; and d) If the role is a quality administrator, then finding all projects under the management of the user, and entering into the quality administrator's project list page.

Use Case 3: Viewing Projects

Assuming, for example, the role of a logon user is a project manager, then clicking on the project name in the project manager's project list page, then entering into the projects basic information page.

Use Case 4: Browsing a Current Task List

Clicking, by the project manager, on the "Current Task List" in the left navigation bar on the project basic information page, and querying all tasks under the current project in background, and displaying the current task list page.

It should be noted that the above descriptions on use cases are merely examples. In the following description, it is assumed that the design task allocating unit 1010 allocates the design task of use case 1 to a designer 1 as task 1, the design task of use cases 3 and 4 to a designer 2 as task 2, and the design task of use case 2 to a designer 3 as task 3.

The design results of the software design will be illustrated with reference to task 1. The design result as submitted by the designer 1 is shown in FIG. 2A, where a sub-design diagram representing a design result during the design of use case 1 is schematically shown.

Figure 2A:
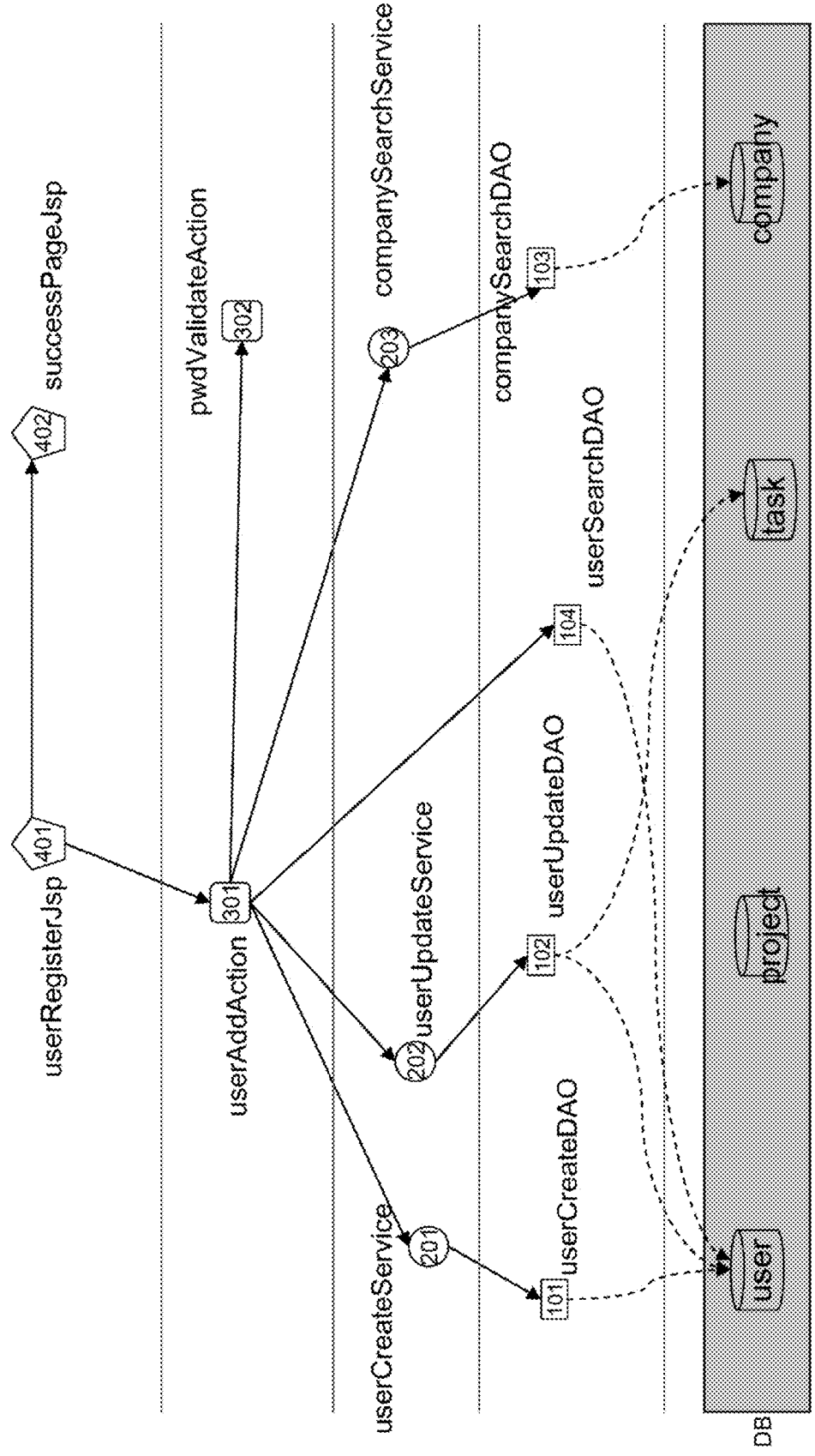
FIGS. 2A-2C schematically show sub-design diagrams of an example software design.

The sub-design diagram as shown in FIG. 2A includes nodes, arrows between nodes, and node types. For example, a node named "userCreateDAO" as indicated by node 101 is connected, via a arrow, to a node "user" representing a database (DB), indicating that in the software design represented by the sub-design diagram, a design artifact "userCreateDAO" will access database "user" of another design artifact. Similarly, it is also shown in the diagram that a design artifact "userCreateService" 201 calls the "userCreateDAO" 101, a design artifact "userAddAction" 301 calls the "userCreateService" 201, and a design artifact "userRegisterJsp" 401 calls the "userCreateService" 301. Nodes "user", "project", "task", and "company" at the bottom indicate data tables of the database.

"Jsp", "Action", "Service" and "DAO" as included in the above design artifact names conform to naming specifications which indicate that the types of corresponding design artifacts are "Jsp", "Action", "Service" and "DAO", respectively, and their meanings are as follows:

Jsp: Implementation of an active page, where display of an active page is realized by an action of calling a description service logic or action;

Action: Packaging some higher-level service logics or packaging some checking actions;

Service: Major service logic implementation, and packaging to some extent the bottom data level so as to improve the reusability;

DAO: Data Access Object, an object for accessing data sheets in a database, implementing basic data deletion, addition, and modification; typically a data sheet corresponds to a Data Access Object, and the granularity of each object may also be determined by the designer itself; and DB: A plurality of data tables in the database.

The up-bottom hierarchical sequence between the types is Jsp>Action>Service>DAO>DB, which is determined by the software architectural hierarchy.

In FIG. 2A, different blocks are used to indicate different types of nodes (i.e., types of design artifacts represented by nodes), and the level of each node is partitioned with a horizontal line from bottom to top. For example, the node 101 is indicated by a rectangular block, indicating that the design artifact represented thereby belongs to a "DAO" type. The node 201 is indicated by a circular block, indicating that the design artifact represented belongs to a "Service" type.

It should be pointed out that the above types "Jsp", "Action", "Service", "DAO", and "DB" are only examples used for indicating a hierarchy of design artifacts. As is known in the art, in practice, different software architectural hierarchy may be selected based on specific requirements of software.

Figure 2B:
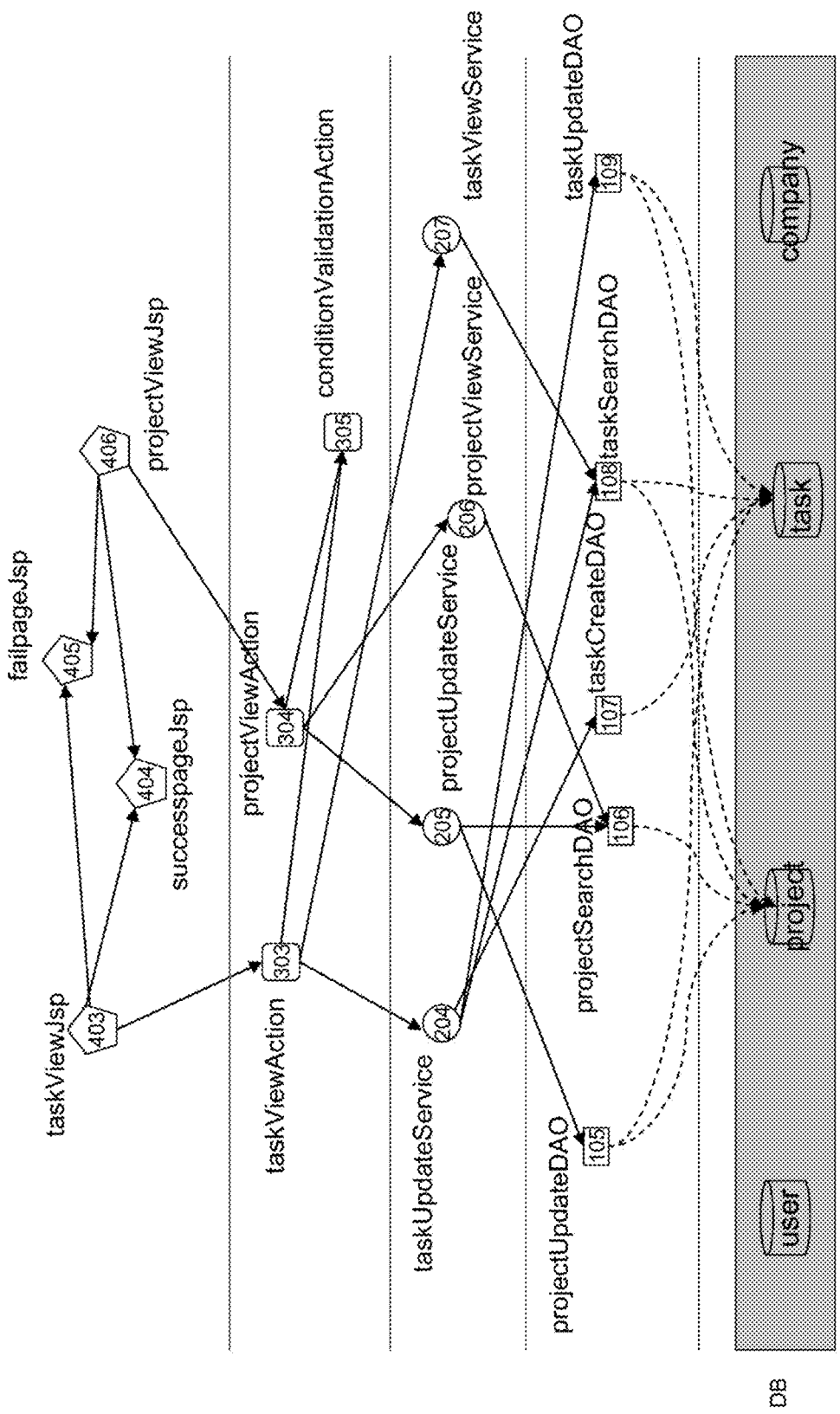
Figure 2C:
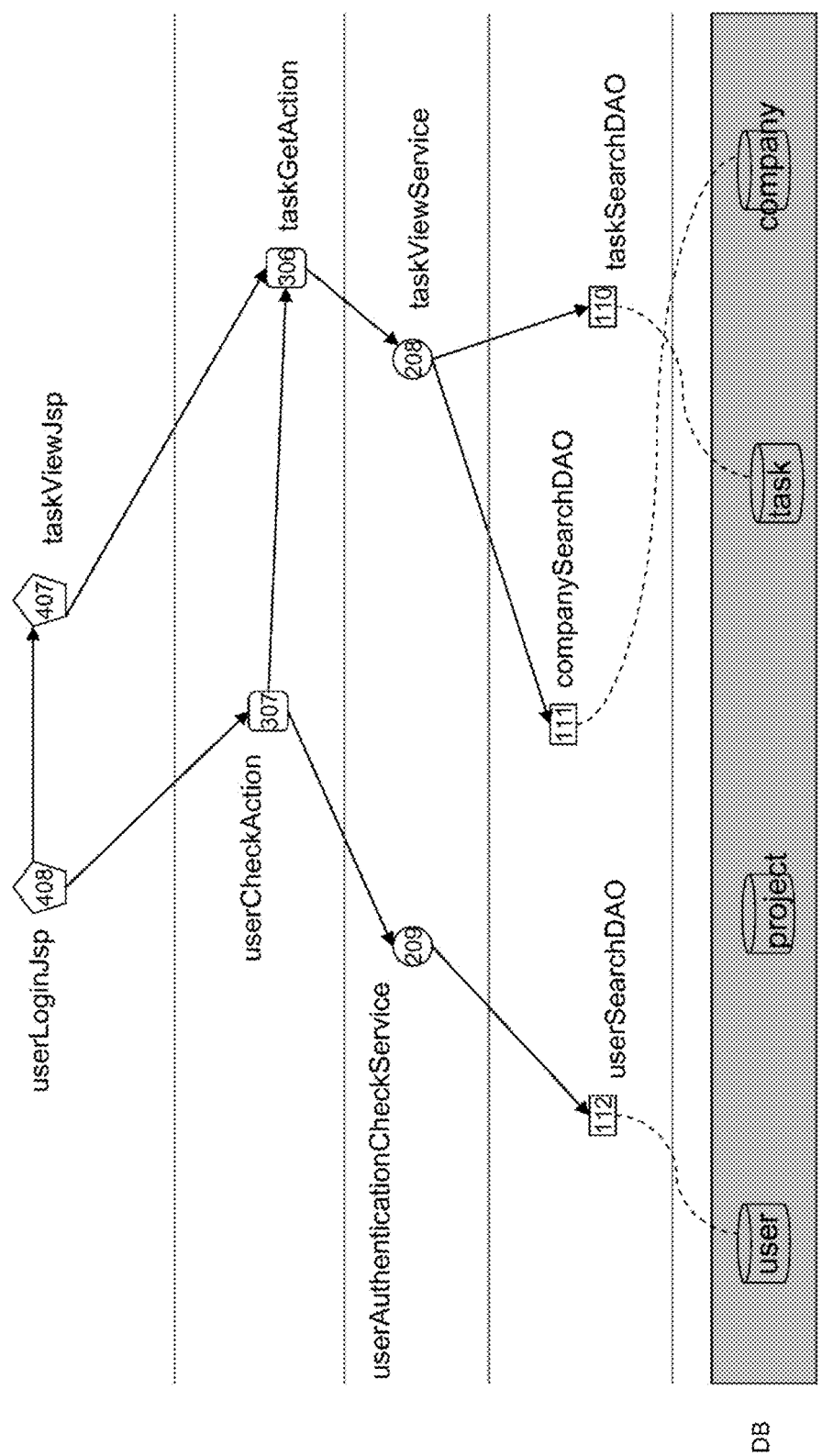

Similarly, the sub-design diagrams for the above use case 2 and use case 3 are shown in FIG. 2B and FIG. 2C, respectively, and their contents will not be detailed here.

It should be noted that while in the description the forms of FIG. 2A, FIG. 2B and FIG. 2C are used to indicate design results, the present invention is not limited thereto. In an implementation, other indication forms can also be adopted, for example, using a table to indicate design results, which could be easily implemented by a person skilled in the art. Therefore, the present invention is not limited to using a specific form of sub-design diagram to indicate a design result.

According to an embodiment of the present invention, during the process of software design, the design collecting and analyzing unit 1020 collects sub-design diagrams 2A, 2B, and 2C of use case 1, of use cases 3 and 4, and of use case 2 from the designer 1, the designer 2, and the designer 3, respectively.

Figure 3A:
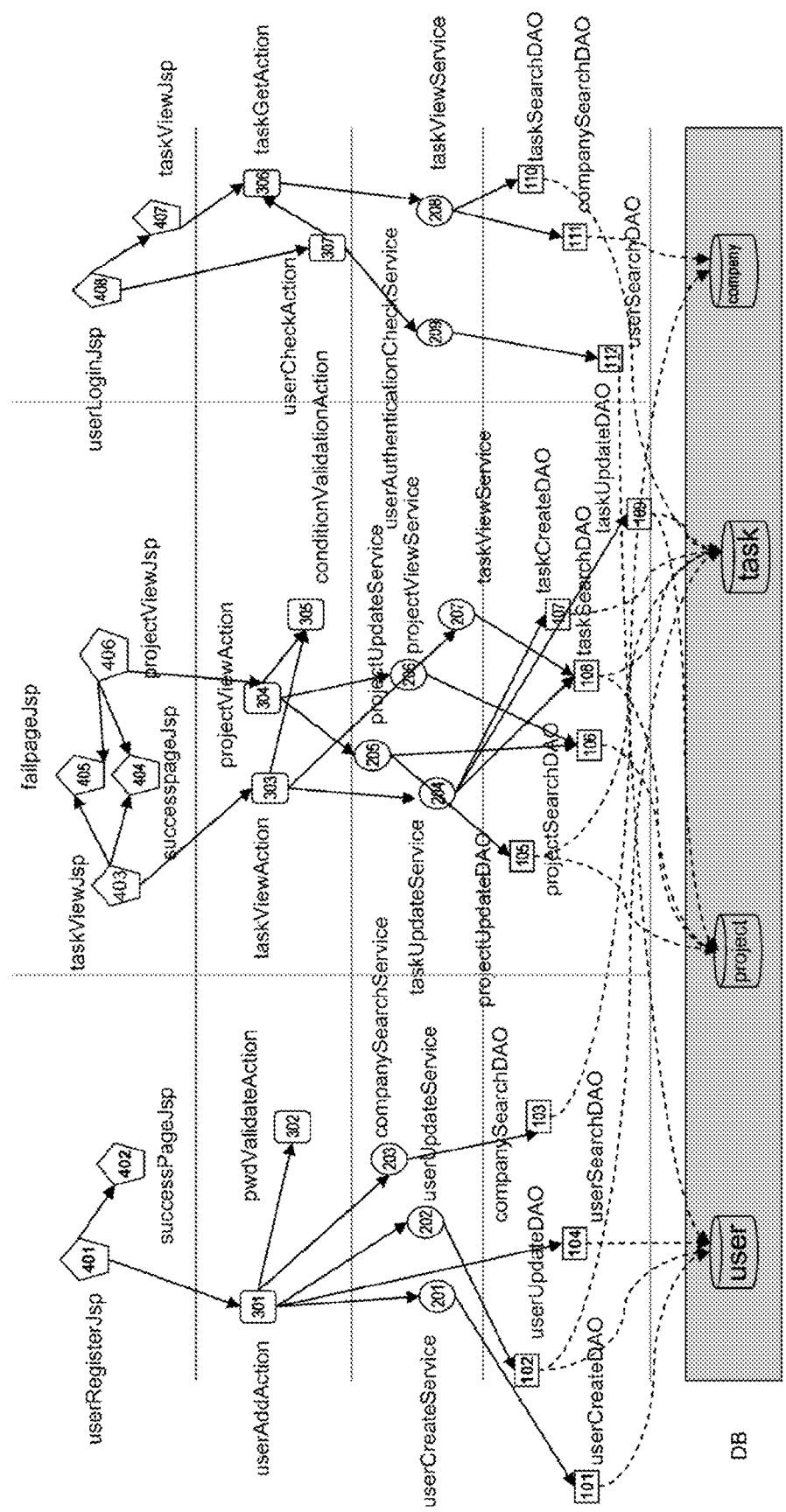
FIG. 3A schematically shows a composed design diagram including the sub-design diagrams as shown in FIGS. 2A-2C.

According to an embodiment of the present invention, the design collecting and analyzing unit 1020 may compose the collected sub-design diagrams into a design diagram, which is called "composed design diagram" herein. For example, FIG. 3A shows a composed design diagram which composes the contents in sub-design diagrams as shown in FIG. 2A-2C. Compared with FIGS. 2A-2C, in FIG. 3A, only the nodes indicating databases are merged, and the contents of the composed design diagram are equivalent to the combination of the contents as shown in FIGS. 2A-2C, with the relationships among different sub-design diagrams formed through database being displayed more directly and intuitively.

Concepts in software design, such as use cases, sub-design diagrams of use cases, and composed design diagrams, have been illustrated above. On this basis, a method for handling a software design conflict according to the present invention will be described with reference to the flow chart of FIG. 4 as well as to the examples in FIGS. 3A-3F.

Figure 4:
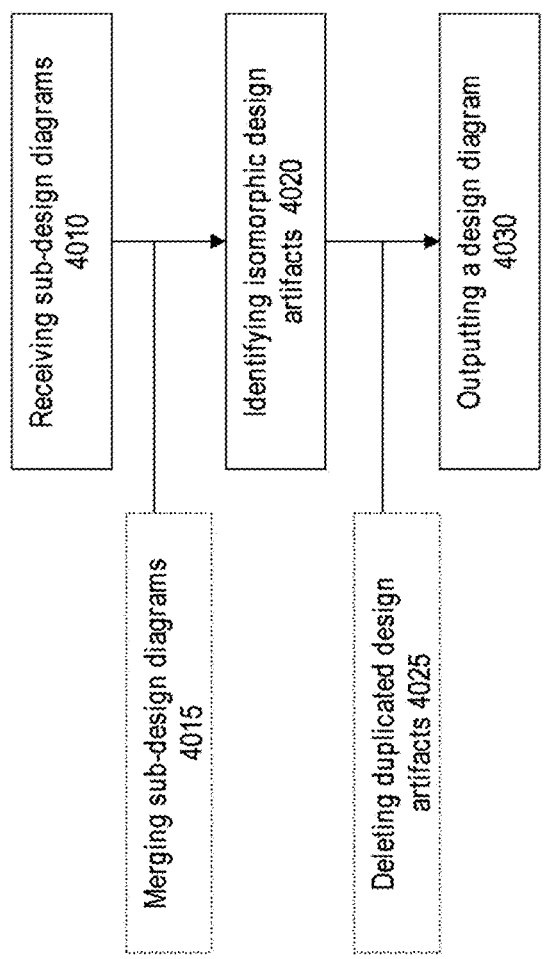
FIG. 4 schematically shows a flow chart of a method according to an embodiment of the present invention.

FIG. 4 schematically shows a flow chart of a method for identifying software design conflict during a software design process according to an embodiment of the present invention. The flow as shown in FIG. 4 includes three major steps.

At step 4010, a software design diagram is received. According to an embodiment of the present invention, three sub-design diagrams as shown in FIGS. 2A-2C are received. As described above with reference to FIG. 2A, each design diagram (also called "sub-design diagram" in this example) includes a plurality of nodes and arrows connecting different nodes, with each node indicating a design artifact. The level of each node is determined by a corresponding design artifact, and an arrow pointing from one node to another node indicates that a design artifact corresponding to the one node depends on a design artifact corresponding to the other node.

It should be understood that despite the different names, "sub-design diagram" and "design diagram" are structurally identical. In this sense, sub-design diagram is a kind of design diagram. Given this context, "design diagram" may refer to a composed design diagram of several "sub-design diagrams".

At step 4020, a level of a design artifact in a sub-design diagram is determined, and isomorphic design artifacts at a given level in the sub-design diagram are identified and marked. Specifically, different design artifacts in a given level that depend on a common design artifact are marked as isomorphic design artifacts.

A level of a design artifact in a design diagram may be determined in accordance with a software architectural hierarchy, for example in accordance with types of design artifacts.

According to an embodiment, if, at step 4010, at least two sub-design diagrams of a software design are received, then before step 4020, the received sub-design diagrams are composed into one design diagram, step 4015. In this case, at step 4020, a level of a design artifact is determined in the composed design diagram, and isomorphic design artifacts in the composed design diagram are identified and marked.

Figure 3B:
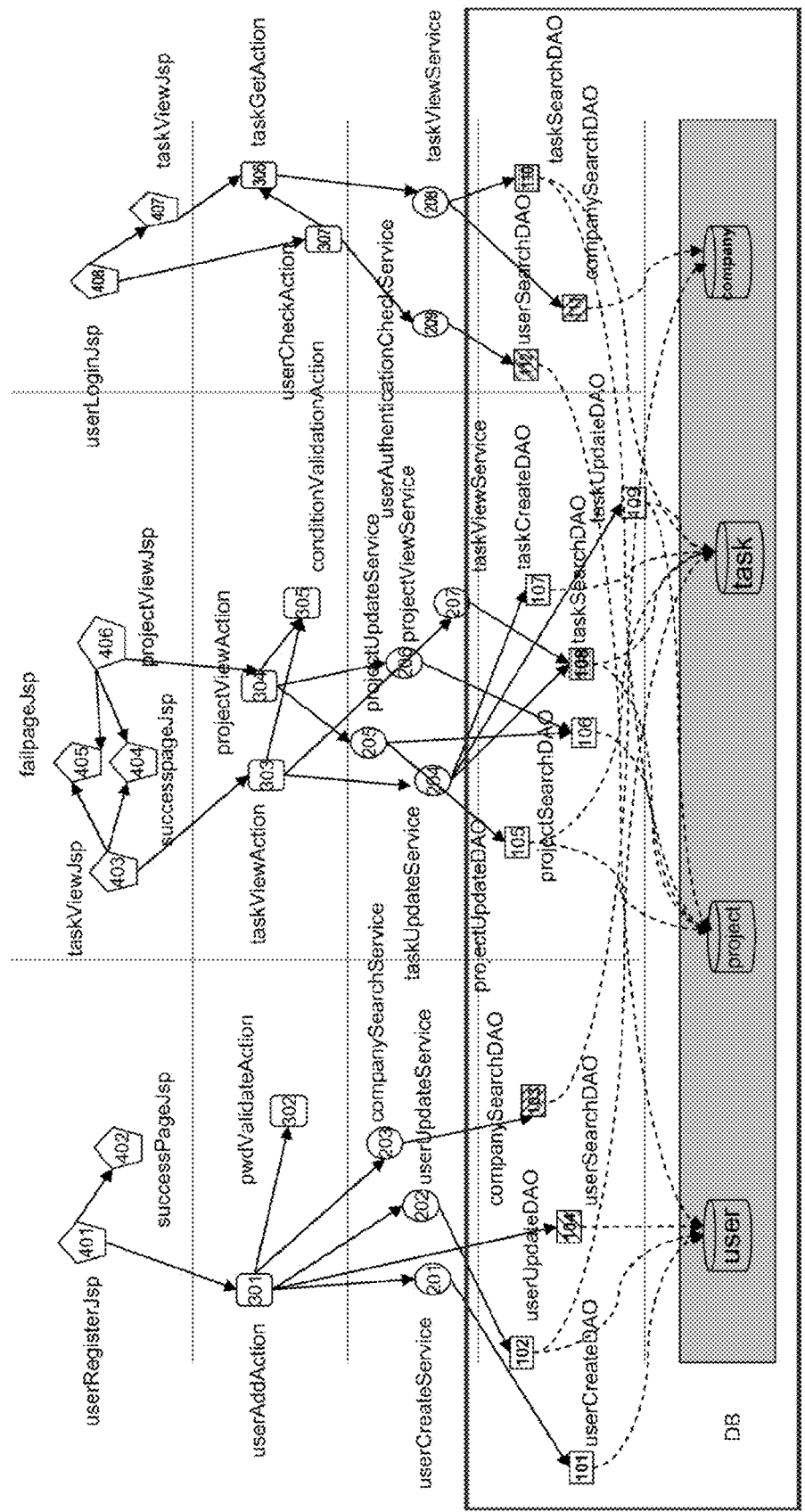
FIGS. 3B-3F schematically show a process of identifying and resolving a conflict between software designs.

For example, by analyzing the second level from bottom in the composed design diagram as shown in FIG. 3A, it is found that the node 104 indicating the design artifact userSearchDAO in the sub-design diagram 2A points to a lower-level data table node "user", and the node 112 indicating the design artifact userSearchDAO in the sub-design diagram 2C also points to the node "user". Then, the design artifact userSearchDAO of the node 104 and the design artifact userSearchDAO of the node 112 are marked as isomorphic design artifacts, as shown in FIG. 3B. In FIG. 3B, the same shading is used to mark node 104 and node 112 to indicate that the design artifact userSearchDAO of the node 104 and the design artifact userSearchDAO of node 112 are isomorphic design artifacts.

In FIG. 3B, the node 103 and node 111 in the second level from bottom is also marked by the same shading pattern, indicating that the design artifact companySearchDAO of node 103 in sub-design diagram 2A and the design artifact companySearchDAO of node 111 in the sub-design diagram 2C are isomorphic design artifacts; similarly, at this level, since the design artifact taskSearchDAO of the node 108 in the sub-design diagram 2B and the design artifact taskSearchDAO of the node 110 in the sub-design diagram 2C both access to the data table node "task" at the lowest level, they are also marked as isomorphic design artifacts.

It should be noted that although in FIG. 3B the same shading pattern is used to mark isomorphic design artifacts, the present invention is not limited thereto. For example, a color or a shadow may be used instead. Also, there may be various kinds of different marking manners, for example, directly storing in a table which design artifacts are isomorphic design artifacts.

At step 4030, the design diagram with the isomorphic design artifacts marked is outputted. If the received sub-design diagrams are merged into a composed design diagram in step 4015, then at step 4030, the composed design diagram with the isomorphic design artifacts marked (e.g., as shown in FIG. 3B) is outputted.

According to an embodiment of the present invention, the above step may be carried out by the design collecting and analyzing unit 1020 as shown in FIG. 1. The design collecting and analyzing unit 1020 outputs the design diagram, with the isomorphic design artifacts marked, to the design conflict resolving unit 1030 to resolve conflicts between different designs.

Hereinafter, the approach of resolving a conflict between designs by the design conflict resolving unit 1030 will be described.

Firstly, the kind of conflict between isomorphic design artifacts between sub-design diagrams is identified. In software design practice, conflicts between isomorphic design artifacts may be classified as "duplicate" and "mergeable".

If two isomorphic design artifacts are of a "duplicate" relationship, it means that the two isomorphic design artifacts could be replaced by each other.

If two isomorphic design artifacts are of a "mergeable" relationship, it means that the two isomorphic design artifacts may be merged into a new design artifact to replace these two isomorphic design artifacts.

Figure 3C:
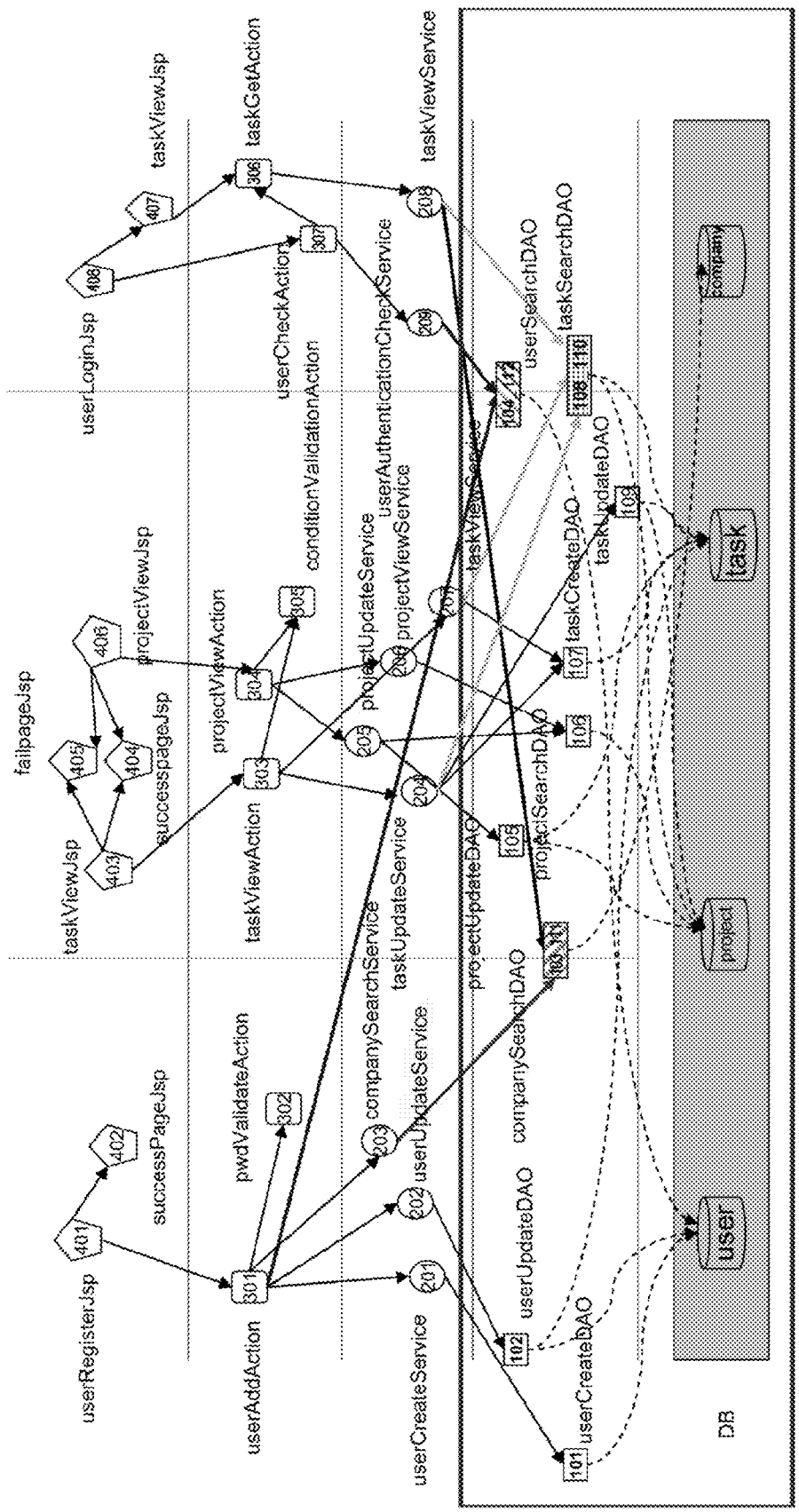

According to an embodiment of the present invention, if a plurality of isomorphic design artifacts are determined to be of duplicate relationship, the design conflict resolving unit 1030 may retain one of the plurality of isomorphic design artifacts while deleting the remaining ones, and then changing an arrow pointing to the nodes of the deleted isomorphic design artifacts to point to the node of the retained isomorphic design artifact, as shown in FIG. 3C. Here, if the design artifacts of node 104 and of node 112 are determined to be of a "duplicate" relationship, and if the design artifacts of node 103 and of node 111 are determined to be of "duplicate" relationship, then a random one of node 104 and node 112 (e.g., node 104) is retained, while the remaining (node 112) is deleted. Then the arrow originally pointing to node 112 is changed to point to the retained node 104_112. Similarly, a random node, for example node 111, from node 103 and node 111 is retained (as indicated by reference sign 103_111), while the remaining node 103 is deleted. It should be noted that the contents of the design artifact represented by the new node 103_111 are the same as the contents of either node 103 or node 111, and the same is true regarding nodes 104 and 112.

If a plurality of isomorphic design artifacts are of mergeable relationship, the design conflict resolving unit 1030 may merge the plurality of isomorphic design artifacts into a new design artifact, dispose the new design artifact in a sub-design diagram, delete the plurality of isomorphic design artifacts, and change an arrow connected to the isomorphic design artifacts to be connected to the new design artifact. For example, given that the design artifacts of node 108 and of node 110 are "mergeable", in FIG. 3C, the node 108 and node 110 are both deleted and replaced by a new node 108_110. It should be noted that the contents of the design artifact represented by the new node 108_110 are different from those of the design artifact represented by the node 108 and node 110 in FIG. 3A.

In software design practice, the design conflict resolving unit 1030 may be operated manually to resolve conflicts. For example, for duplicated isomorphic design artifacts, the designers may negotiate to determine which design artifacts are to be deleted and how to provide an interface for calling the retained isomorphic design artifact. For mergeable isomorphic design artifacts, the designers may negotiate to determine how to merge the design artifacts into a new design artifact and how to provide an interface for calling the merged design artifact.

As a result of resolving conflicts, a new sub-design diagram is obtained. The new sub-design diagram may be further analyzed by the design collecting and analyzing unit 1020.

The sub-design diagram corresponding to FIG. 3C as generated by the design conflict resolving unit 1030 may be inputted to the design collecting and analyzing unit 1020, such that steps 4010-4030 are repetitively performed for a higher level corresponding to the "Service" type from bottom to top.

Figure 3D:
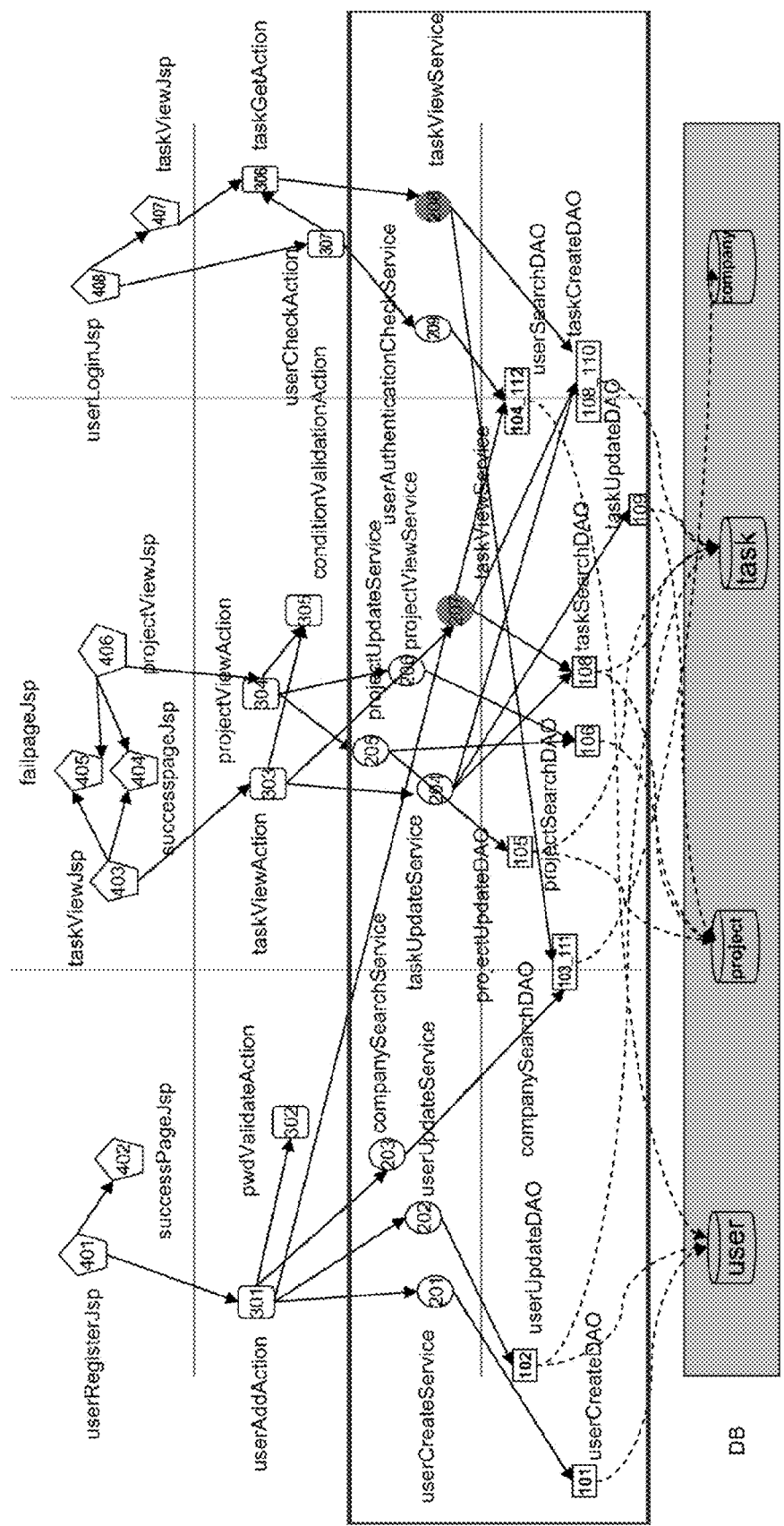

As shown in FIG. 3D, at step 4020, it is identified that node 207 and node 208 are both connected to a common low-level node 108_110, indicating that the design artifact taskViewService corresponding to node 207 and the design artifact taskViewService corresponding to node 208 depend on the design artifact taskCreateDAO corresponding to node 108_110. Then the design artifact taskViewService corresponding to node 207 and the design artifact taskViewService corresponding to node 208 are marked as isomorphic design artifacts.

Figure 3E:
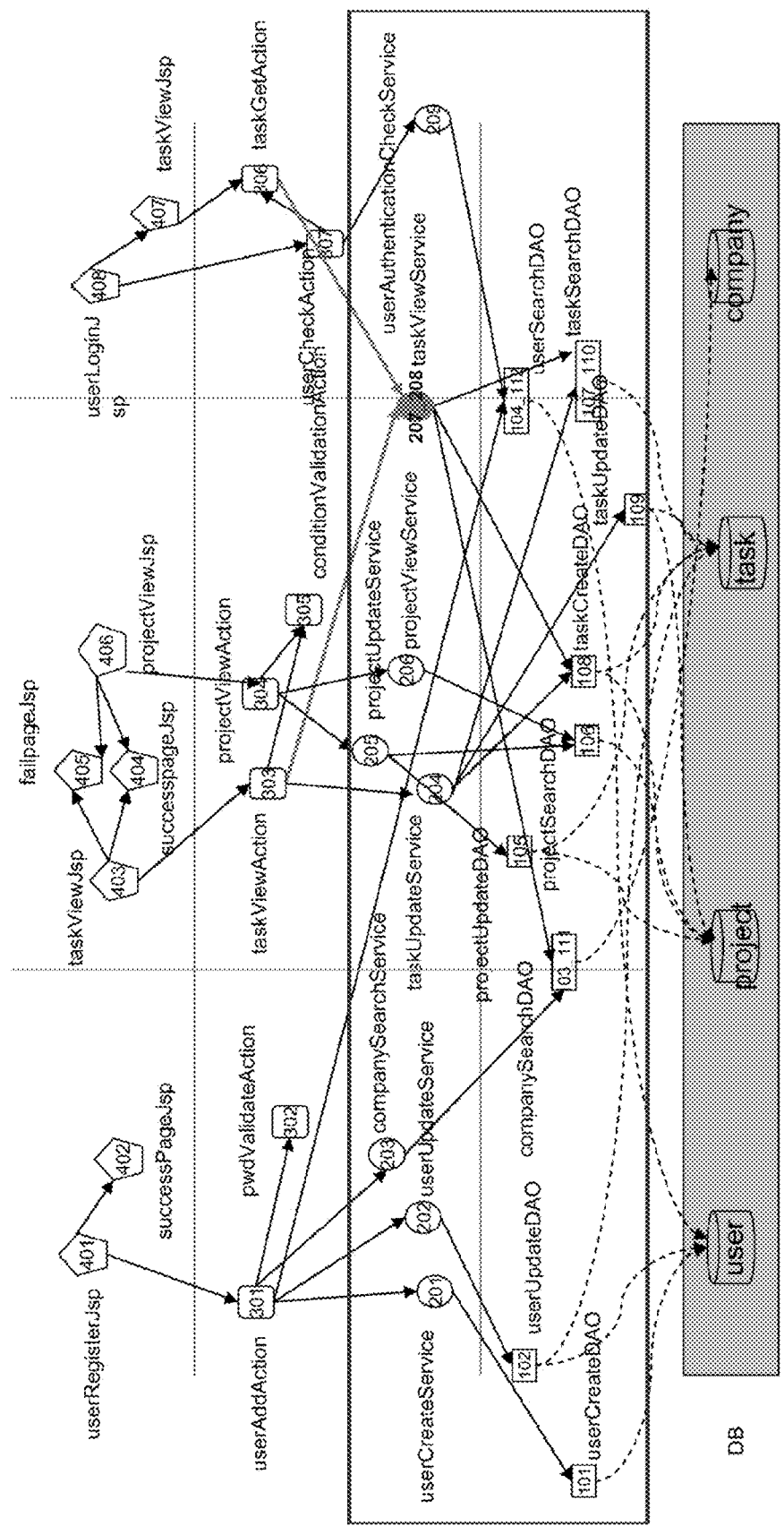

After the design collecting and analyzing unit 1020 provides the composed diagram as shown in FIG. 3D to the design conflict resolving unit 1030, the latter, in view of the determined relationship between the design artifact 207 and the design artifact 208, performs deletion or merge processing to the design artifact 207 and design artifact 208, the result of which is shown in FIG. 3E, where the nodes 207 and 208 as shown in FIG. 3D are replaced by a node 207_208, and the connection line pointing to node 207 from node 303 and the connection line pointing to node 207 from node 306 are now changed as pointing to node 207_208.

Figure 3F:
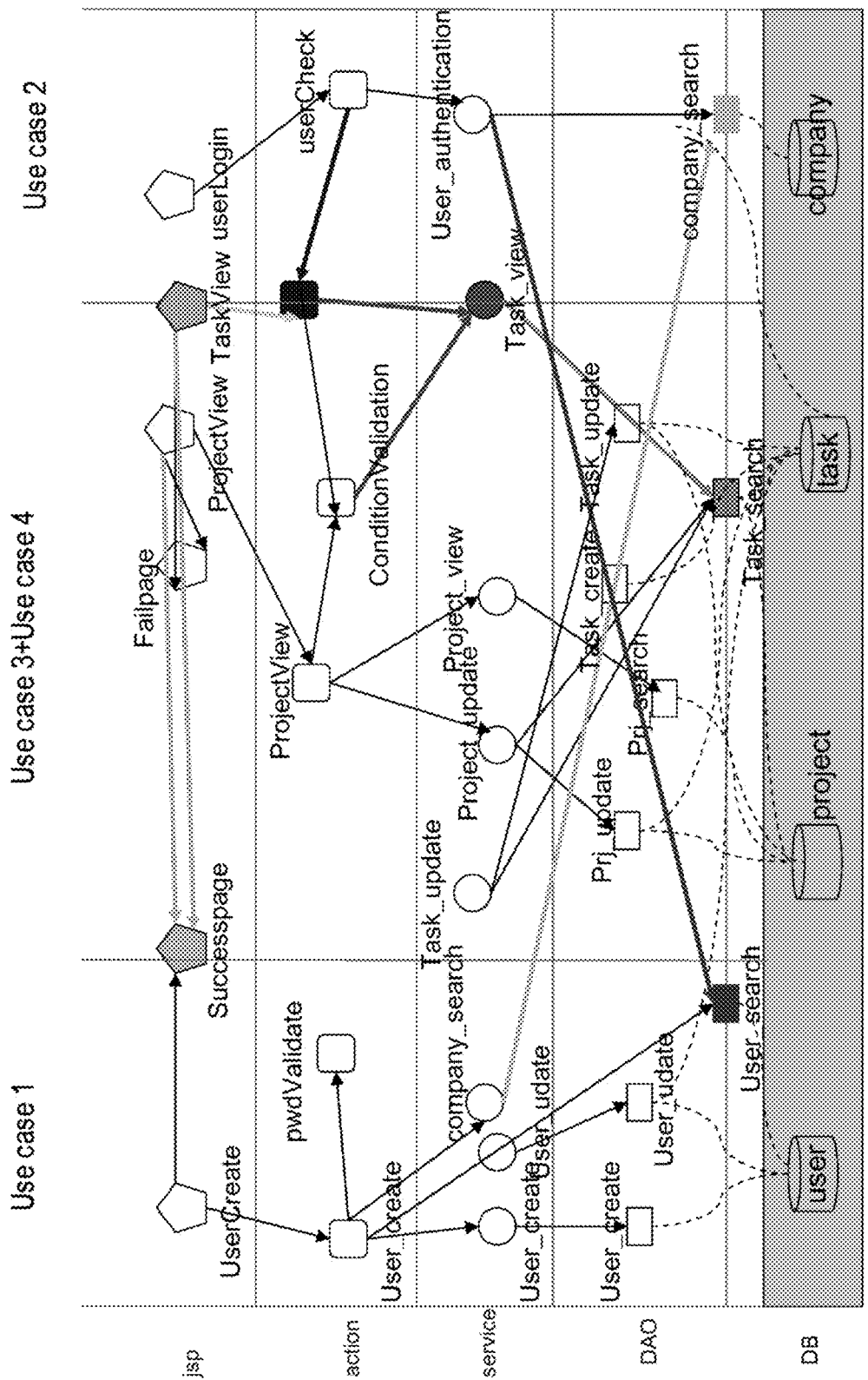

In a similar approach, through interaction between the design collecting and analyzing unit 1020 and the design conflict resolving unit 1030, conflicts between designs are identified and resolved hierarchically from bottom to top, and the original sub-design diagrams 2A, 2B, and 2C are turned into a composed design diagram similar to the one shown in FIG. 3F; compared with FIG. 3A, FIG. 3F has a greatly reduced number of nodes as well as a simplified relationship between them.

In the above described embodiments, a conflict is resolved in the design conflict resolving unit 1030. However, according to an embodiment of the present invention, the design conflict resolving unit may be partially implemented in the design collecting and analyzing unit 1020.

For example, at step 4020 or thereafter, the design collecting and analyzing unit 1020 may further determine whether the isomorphic design artifacts are of "duplicate" or "mergeable" relationship based on other information of the design result.

As mentioned previously, in view of specific design standards, a design result submitted by a designer may include a description on design artifacts, and the degree of detail of such a description may be sufficient to automatically determine whether isomorphic design artifacts are of a "duplicate" or "mergeable" relationship.

As depicted above with reference to FIG. 4, if it is determined that a plurality of isomorphic design artifacts are of a "duplicate" relationship, then one of the plurality of isomorphic design artifacts may be retained while the remaining ones are deleted. Also, an arrow pointing to the nodes of the deleted isomorphic design artifacts is changed to point to the node of the retained isomorphic design artifact. The processing is similar to that on the design artifact of node 104 and the design artifact of node 112 as above described with reference to FIG. 3B and FIG. 3C.

Corresponding to the above processing, information about the above processing approach and the related design artifacts may also be passed on to the design conflict resolving unit 1030.

Hereinafter, a more detailed implementation approach for a design collecting and analyzing unit 1020 in a system 10 according to an embodiment of the present invention will be described with reference to FIG. 1.

As shown in FIG. 1, the design collecting and analyzing unit 1020 includes a receiving unit 2010, an identifying unit 2020, and an outputting unit 2030.

The receiving unit 2010 may receive a sub-design diagram of a software design, wherein the sub-design diagram includes a plurality of nodes and arrows connecting different nodes, with each node indicating a design artifact, and an arrow pointing from one node to another node indicating that the design artifact corresponding to the one node depends on the design artifact corresponding to the other node.

The identifying unit 2020 may determine a level of a design artifact in a sub-design diagram, identify different design artifacts at a given level of the sub-design diagram that depend on a common design artifact, and mark them as isomorphic design artifacts.

There are a variety of approaches to determine a level of a design artifact. According to an embodiment of the present invention, the identifying unit 2020 may determine a level of a design artifact in a design diagram based on the software architectural hierarchy. In an embodiment of the present invention, the type of a design artifact is obtained according to a design artifact name in conformity to a naming specification, thereby deriving the level of corresponding node. Of course, as known by a person skilled in the art, there are also other approaches to determine a level of a design artifact. For example, direct assignment in a sub-design diagram performed in a certain way, or detailed description provided in a form of spreadsheet on a design artifact in a sub-design diagram.

The outputting unit 2030 may output a sub-design diagram with the isomorphic design artifacts marked.

It should be noted that although FIGS. 3A-3F indicating an identifying process are all composed design diagrams, a composed design diagram may also be partitioned into sub-design diagrams. Thus even if a composed design diagram is outputted, it may be understood as outputting sub-design diagrams contained in the composed design diagram.

Alternatively, the design collecting and analyzing unit 1020 may include a merging unit 2015. If the receiving unit receives at least two sub-design diagrams of software design, then the merging unit 2015 will merge the at least two sub-design diagrams as received by the receiving unit into a composed design diagram to provide to the identifying unit 2020. A simple merging approach is to merge different nodes corresponding to a common data table and located at the utmost bottom level of a sub-design diagram into one node, as shown in FIG. 3A.

The identifying unit 2020 determines a level of a design artifact in a sub design diagram, and identifies and marks the isomorphic design artifacts at a given level of a sub-design diagram. Specifically, at a given level, different design artifacts depending on a common design artifact are marked as isomorphic design artifacts. The outputting unit 2030 outputs a composed design diagram with the isomorphic design artifacts marked.

Through the design conflict resolving unit 1030 and based on the design diagram outputted from the outputting unit 2030, designers may coordinate to resolve conflicts between software designs, thereby generating a new software design. According to an embodiment of the present invention, the generated new software design may be provided, via the receiving unit 2010, to the design collecting and analyzing unit 1020 in a form of sub-design diagram, so as to continue identifying conflicts between designs from bottom to top.

According to an embodiment of the present invention, when resolving a conflict between software designs through the design conflict resolving unit 1030, if it is determined that isomorphic design artifacts are of a duplicate relationship, then one of the plurality of isomorphic design artifacts is retained while the remaining isomorphic design artifacts are deleted, and arrows pointing to nodes of the deleted isomorphic design artifacts are changed to point to the node of the retained isomorphic design artifact. If isomorphic design artifacts are determined to be mergeable, then these isomorphic design artifacts are merged into a new design artifact and then deleted, and a arrow originally connected to the deleted isomorphic design artifacts is changed to be connected to the new design artifact.

According to another embodiment of the present invention, conflicts may also be resolved while identifying the conflicts. According to an embodiment of the present invention, the design collecting and analyzing unit 1020 may further include a deleting unit 2025, for deleting duplicated isomorphic design artifacts. Specifically, the deleting unit 2025 may determine whether a plurality of isomorphic design artifacts marked by the identifying unit 1020 are of a duplicate relationship; if so, then one of the plurality of isomorphic design artifacts is retained while the remaining ones are deleted, and a arrow pointing to the nodes of deleted isomorphic design artifacts is changed to point to the node of the retained isomorphic design artifact.

The method and the system for handling design conflicts in parallel design according to the present invention have been schematically described above. It should be understood that for the sake of conciseness, many details related to software design have been omitted in the above description. However, persons skilled in the art, based on the above description of the principle of the present invention and its various embodiments in the description, can completely implement the above and further embodiments.

Though the present invention and its embodiments have been described above with reference to the diagrams, it should be understood that the present invention is not stringently limited to these embodiments, and in the case of not departing from the scope and principle of the present invention, a person of normal skill in the art can carry out various kinds of variations and modifications to the embodiments. All such variations and modifications are intended to be included in the scope of the present invention as limited in the appended claims.

Moreover, based on the above description, the person skilled in the art would appreciate that the present invention may be embodied as an apparatus, a method, or a computer program product. Thus, the present invention may be specifically implemented in the following manners, namely, complete hardware, complete software (including firmware, resident software, microcode, etc), or a combination of part software and part hardware as generally called a "circuit," "module," or "system" in this text. Further, the present invention may adopt a form of computer program product as embodied in any tangible medium of expression, the medium including computer-available program code.

Any combination of one or more computer-available or computer-readable mediums may be used. The computer-available or computer-readable medium may be for example, but not limited to, electrical, magnetic, optical, electromagnetic, infrared, or semiconductor systems, means, device, or propagation medium. More specific examples (non-exhaustive list) of the computer-readable medium include the following: an electric connection having one or more leads, a portable computer magnetic disk, hard disk, random access memory (RAM), read-only memory (ROM), erasable programmable read-only memory (EPROM or flash disk), optical fiber, portable compact disk read-only memory (CD-ROM), optical storage device, a transmission medium for example supporting internet or intranet, or a magnetic storage device. It should be noted that the computer-available or computer readable medium may even be a paper or other suitable medium printed with a program thereon, because the program may be obtained electronically by electrically scanning such paper or other medium, and then compiled, interpreted or processed in a suitable manner, and if necessary, stored in a computer memory. In the context of the present document, a computer-available or computer-readable medium may be any medium containing, storing, communicating, propagating, or transmitting a program available for an instruction execution system, apparatus or device, or associated with the instruction execution system, apparatus, or device. A computer-available medium may include a data signal contained in a base band or propagated as a part of carrier and embodying a computer-available program code. A computer-available program code may be transmitted by any suitable medium, including, but not limited to, radio, wire, cable, or RF, etc.

A computer program code for executing operation of the present invention may be compiled by any combination of one or more program design languages, the program design languages including object-oriented program design languages, such as Java, Smalltalk, C++, etc, as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through any kind of network, including local area network (LAN) or wide area network (WAN), or connected to an external computer (for example using an internet service provider via Internet).

Further, each block in the flow charts and/or block diagrams and combination of each block in the flow charts and/or block diagrams of the present invention may be implemented by computer program instructions. These computer program instructions may be provided to a processor of a utility computer, a dedicated computer or other programmable data processing apparatus, to thereby generating a machine such that these instructions executed through the computer or other programmable data processing apparatus generate means for implementing functions/operations prescribed in the blocks of the flow charts and/or block diagrams.

These computer program instructions may also be stored in a computer-readable medium capable of instructing a computer or other programmable data processing means to work in a particular way, such that an instruction stored in the computer readable medium generates a manufacture including an instruction means for implementing the functions/operations as prescribed in blocks in the flow charts and/or block diagrams; or the computer program instruction may also be loaded on the computer or other programmable data processing means, such that a series of operation steps are carried out on the computer or other programmable data processing means to produce a process implemented by the computer, such that an instruction executed on the computer or other programmable means can implement the process of functions/operations as prescribed in the blocks in the flow charts and/or block diagrams.

The flow charts and block diagrams in the diagrams illustrate a hierarchical architecture, function and operation likely implemented by the system, method and computer program product according to various embodiments of the present invention. At this point, each block in the flow charts or block diagrams may represent a module, a program segment, or a part of code, the module, the program segment, or the part of code including one or more executable instructions for implementing a prescribed logical function. It should be noted that, in some alternative implementations, the functions noted in the blocks may also occur in a sequence different from what is noted in the diagrams. For example, two successively expressed blocks may essentially be executed in parallel, and sometimes they may be executed in a reverse sequence, depending on the involved function. It should also be noted that each block in the block diagrams and/or flow charts and a combination of blocks in block diagrams and/or flow charts may be implemented by a dedicated hardware-based system for executing a prescribed function or operation or may be implemented by a combination of dedicated hardware and computer instructions.

What is claimed is:

1. A method for handling software design conflicts, comprising:

allocating one or more of a plurality of design tasks for a software design to a plurality of designers, wherein each of the plurality of design tasks correspond to a portion of the software design, wherein the allocation of each of the plurality of design tasks is based on a use case associated with each of the plurality of design tasks;

receiving a plurality of design diagrams, wherein each of the plurality of design diagrams corresponds to one of the plurality of design tasks, wherein each of the plurality of design diagrams comprises a plurality of nodes and arrows connecting said nodes, wherein each said node indicates a design artifact, and wherein said arrow pointing from one node to another node indicates that said design artifact corresponding to the one node depends on said design artifact corresponding to the other node;

merging the plurality of design diagrams into a composed design diagram, determining a level of the plurality of design artifacts in said composed design diagram;

identifying one or more different design artifacts at a given level of said composed design diagram that depend on a common design artifact, and marking them as isomorphic design artifacts;

determining whether said marked isomorphic design artifacts are of a duplicate relationship, wherein one of said isomorphic design artifacts is retained, while the remaining said isomorphic design artifacts are deleted, and wherein said arrow pointing to said nodes of said deleted isomorphic design artifacts are changed to point to said node of said retained isomorphic design artifact; and outputting a new composed design diagram with said isomorphic design artifacts marked.

2. The method according to claim 1, wherein determining said level of said design artifact in said composed design diagram comprises determining said level of said design artifact in said composed design diagram according to a software architectural hierarchy.

3. The method according to claim 2, further comprising determining whether said marked isomorphic design artifacts are of a mergeable relationship, wherein said isomorphic design artifacts are merged into a new design artifact, while the original said isomorphic design artifacts are deleted, and wherein said arrow originally connected to said deleted isomorphic artifacts are changed to be connected to said new design artifact.

4. The method according to claim 1, further comprising determining whether said marked isomorphic design artifacts are of a mergeable relationship, wherein said isomorphic design artifacts are merged into a new design artifact, while the original said isomorphic design artifacts are deleted, and wherein said arrow originally connected to said deleted isomorphic artifacts are changed to be connected to said new design artifact.

5. A system for handling software design conflicts, comprising:

an allocating unit for assigning one or more of a plurality of design tasks for a software design to a plurality of designers, wherein each of the plurality of design tasks correspond to a portion of the software design, wherein the allocation of each of the plurality of design tasks is based on a use case associated with each of the plurality of design tasks;

a receiving unit comprising a processor configured for receiving a plurality of design diagrams, wherein each of the plurality of design diagrams corresponds to one of the plurality of design tasks, wherein each of the plurality of design diagrams comprises a plurality of nodes and arrows connecting said nodes, wherein each said node indicates a design artifact, and wherein said arrow pointing from one node to another node indicates that said design artifact corresponding to the one node depends on said design artifact corresponding to the other node;

a merging unit for merging the plurality of design diagrams into a composed design diagram, an identifying unit, for determining a level of a design artifact in said composed design diagram, identifying different design artifacts at a given level of said composed design diagram that depend on a common design artifact, and marking them as isomorphic design artifacts;

a deleting unit, for retaining one of said plurality of isomorphic design artifacts marked by said identifying unit and being of a duplicate relationship, while deleting the remaining isomorphic design artifacts, wherein said arrow pointing to said nodes of said deleted isomorphic design artifacts are changed to point to said node of said retained isomorphic design artifact; and an outputting unit, for outputting a new composed design diagram with said isomorphic design artifacts marked.

6. The system according to claim 5, wherein said identifying unit determines a level of said design artifact in said composed design diagram according to a software architectural hierarchy.

7. The system according to claim 5, further comprising: a design conflict resolving unit, for resolving conflicts between software designs based on an output result of said outputting unit, thereby generating a new software design.

8. The system according to claim 7, wherein said design conflict resolving unit further provides said generated new software design to said receiving unit.

9. The system according to claim 7, wherein said isomorphic design artifacts are of a duplicate relationship, wherein said design conflict resolving unit retains one of said plurality of isomorphic design artifacts while deleting the remaining said isomorphic design artifacts, and wherein said arrow pointing to said nodes of said deleted isomorphic design artifacts are changed to point to said node of said retained isomorphic design artifact.

10. The system according to claim 7, wherein said isomorphic design artifacts are of a mergeable relationship, wherein said design conflict resolving unit merges said isomorphic design artifacts into a new design artifact and deletes said isomorphic design artifacts, and wherein said arrow pointing to said nodes of said deleted isomorphic design artifacts are changed to point to said node of said new design artifact.

11. A non-transitory computer readable article of manufacture tangibly embodying computer readable instructions which when executed causes a computer to carry out the steps of a method according to claim 1.

12. A method for handling software design conflicts, comprising:

allocating one or more of a plurality of design tasks for a software design to a plurality of designers, wherein each of the plurality of design tasks correspond to a portion of the software design, wherein the allocation of each of the plurality of design tasks is based on a use case associated with each of the plurality of design tasks;

receiving at least two sub-design diagrams of a software design, wherein each of the least two sub-design diagrams corresponds to one of the plurality of design tasks and wherein said sub-design diagrams are merged to form a composed design diagram, wherein said composed design diagram comprises a plurality of nodes and arrows connecting said nodes, and wherein each said node indicates a design artifact, and said arrow pointing from one node to another node indicates that said design artifact corresponding to said one node depends on said design artifact corresponding to said other node;

determining a level of said design artifact in said composed design diagram, identifying different said design artifacts at a given level of said composed design diagram that depend on a common design artifact according to a software architectural hierarchy, and marking them as isomorphic design artifacts;

outputting a new design diagram with said isomorphic design artifacts marked;

determining whether said marked isomorphic design artifacts are of a duplicate relationship, wherein one of said isomorphic design artifacts is retained while deleting the remaining said isomorphic design artifacts, and said arrow pointing to said nodes of said deleted isomorphic design artifacts are changed to point to said node of said retained isomorphic design artifact; and determining whether said marked isomorphic design artifacts are of a mergeable relationship, wherein said isomorphic design artifacts are merged into a new design artifact, deleting said isomorphic design artifacts, and changing said arrow originally connected to said deleted isomorphic artifacts to said new design artifact.

* * * * *